(12) United States Patent
Luo et al.

(10) Patent No.: US 8,982,743 B2
(45) Date of Patent: Mar. 17, 2015

(54) DAI DESIGNS FOR FDD CARRIER AGGREGATION

(75) Inventors: Xiliang Luo, Northridge, CA (US); Wanshi Chen, San Diego, CA (US); Peter Gaal, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 13/106,699

(22) Filed: May 12, 2011

(65) Prior Publication Data

US 2011/0280164 A1    Nov. 17, 2011

Related U.S. Application Data

(60) Provisional application No. 61/345,013, filed on May 14, 2010.

(51) Int. Cl.
| | |
|---|---|
| H04J 1/00 | (2006.01) |
| H04W 4/00 | (2009.01) |
| H04L 5/00 | (2006.01) |
| H04L 5/14 | (2006.01) |

(52) U.S. Cl.
CPC .............. *H04L 5/0091* (2013.01); *H04L 5/001* (2013.01); *H04L 5/0053* (2013.01); *H04L 5/14* (2013.01)
USPC .......................................... 370/281; 370/329

(58) Field of Classification Search
USPC .................................. 370/281, 329
See application file for complete search history.

(56) References Cited

U.S. PATENT DOCUMENTS

| 8,379,585 B2* | 2/2013 | Lee et al. ............... 370/329 |
| 2010/0260135 A1* | 10/2010 | Fan et al. ............... 370/329 |
| 2011/0002276 A1* | 1/2011 | Chen et al. ............. 370/329 |

FOREIGN PATENT DOCUMENTS

| CN | 101499882 A | 8/2009 |
| JP | 2006136997 A | 6/2006 |
| WO | 2006036391 | 4/2006 |

OTHER PUBLICATIONS

CATT: "DAI Design for LTE-A", 3GPP Draft; R1-102644, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; 20100510, May 4, 2010, XP050419856, [retrieved on May 4, 2010].

(Continued)

*Primary Examiner* — Omar Ghowrwal
*Assistant Examiner* — Angel Brockman
(74) *Attorney, Agent, or Firm* — Paul Kuo

(57) ABSTRACT

Certain aspects of the present disclosure relate to techniques for indicating downlink assignments to a user equipment (UE). According to certain aspects, the techniques generally involve generating a downlink assignment index (DAI) indicating a number of assigned downlink transmissions for a user equipment (UE) configured to communicate using multiple component carriers and transmitting a physical downlink control channel (PDCCH) containing the DAI to the user equipment (UE) in a frequency division duplexing (FDD) subframe in which uplink and downlink transmissions may take place at the same time on different carrier frequencies.

62 Claims, 11 Drawing Sheets

(56) References Cited

OTHER PUBLICATIONS

CATT: "UL ACK/NACK Transmission Design in FDD with CA", 3GPP Draft; R1-100876, 3rd Generation Partnership Project (3GPP), Mobile Competence Centre ; 650, Route Des Lucioles ; F-06921 Sophia-Antipolis Cedex ; France, vol. RAN WGI, no. San Francisco, USA; 20100222, Feb. 16, 2010, XP050418480, [retrieved on Feb. 16, 2010].
Huawei: "UL ACK/NACk feedback related DCI design for carrier aggregation", 3GPP Draft; R1-101943, 3rd Generation Partnership Project (3GPP), Mobile Competence Centre ; 650, Route Des Lucioles ; F-06921 Sophia-Antipolis Cedex ; France, vol. RAN WGI, no. Beijing, china; 20100412, Apr. 6, 2010, XP050419287, [retrieved on Apr. 6, 2010].
International Search Report and Written Opinion—PCT/US2011/036550, ISA/EPO—Sep. 27, 2011.
Nokia Siemens Networks et al: "On the need for cross-carrier A/N bundling", 3GPP Draft; R1-102942, 3rd Generation Partnership Project (3GPP), Mobile Competence Centre ; 650, Route Des Lucioles ; F-06921 Sophia-Antipolis Cedex ; France, vol. RAN WGI, no. Montreal, Canada; 20100510, May 4, 2010, XP050420058, [retrieved on May 4, 2010].
Nokia Siemens Networks et al: "UL control signalling to support bandwidth extension in LTE Advanced" 3GPP Draft; R1-090724, 3rd Generation Partnership Project (3GPP), Mobile Competence Centre ; 650, Route Des Lucioles ; F-06921 Sophia-Antipolis Cedex ; France, no. Athens, Greece; 20090203, Feb. 3, 2009, XP050318591 [retrieved on Feb. 3, 2009].
Gatt: "DAI Design for L TE-A", 3GPP Draft; R1-1 04311, 3rd Generation Partnership Project (3GPP), Mobile Competence Centre; 650, Route Des Lucioles; F-06921 Sophia-Antipolis Cedex; France, vol. RAN WG1, No. Madrid, Spain; 20100823, Aug. 17, 2010, XP050449669, [retrieved on Aug. 17, 2010].
Panasonic: "UL ACK/NACK transmission on PUCCH for carrier aggregation", 3GPP TSG-RAN WG1 Meeting #58bix, 3GPP, Oct. 16, 2009, RI-093942, pp. 4.
Samsung: "Need for DAI and HARQ-ACK Transmission Aspects with CA", 3GPP Draft; R1-104576 DAI for A_N in Pusch, 3rd Generation Partnership Project (3GPP), Mobile Competence Centre; 650, Route Des Lucioles; F-06921 Sophia-Antipolis Cedex; France, vol. RAN WG1, No. Madrid, Spain; Aug. 23, 2010, Aug. 17, 2010, XP050449872, [retrieved on Aug. 17, 2010].
3rd Generation Partnership Project; Technical Specification Group Radio Access Network; Evolved Universal Terrestrial Radio Access (E-UTRA); Physical layer procedures (Release 9), 3GPP Draft; DRAFT3GPP TS 36.213 V9.1.0, Draft 36213-910, 3rd Generation Partnership Project (3GPP), Mobile Competence Centre; 650, Route Des Lucioles; F-06921 Sophia-Antipolis Cedex; France, vol. RAN WG1, Mar. 22, 2010, XP050417605, [retrieved on Mar. 22, 2010].

* cited by examiner

| (TOTAL # DL GRANTS, ACCUM INDEX) | DAI |
|---|---|
| (1,0) | 000 |
| (2, 0-1) | 001 |
| reserved | 010 |
| reserved | 011 |
| reserved | 100 |
| reserved | 101 |
| reserved | 110 |
| reserved | 111 |

| (TOTAL # DL GRANTS, ACCUM INDEX) | DAI |
|---|---|
| (1,0) | 000 |
| (2, 0) | 001 |
| (2, 1) | 010 |
| (3, 0-2) | 011 |
| reserved | 100 |
| reserved | 101 |
| reserved | 110 |
| reserved | 111 |

1200

| (TOTAL # DL GRANTS, ACCUM INDEX) | DAI |
|---|---|
| (1,0) | 000 |
| (2, 0) | 001 |
| (2, 1) | 010 |
| (3, 0) | 011 |
| (3, 1) | 100 |
| (3, 2) | 101 |
| (4, 0-3) | 110 |
| reserved | 111 |

| (TOTAL # DL GRANTS, ACCUM INDEX) | DAI |
|---|---|
| (1,0) | 000 |
| (2, 0) | 001 |
| (2, 1) | 010 |
| (3, 0) | 011 |
| (3, 1-2) | 100 |
| (4, 0-1) | 101 |
| (4, 2-3) | 110 |
| (5, 0-4) | 111 |

FIG. 13

DAI DESIGNS FOR FDD CARRIER AGGREGATION

CLAIM OF PRIORITY UNDER 35 U.S.C. §119

The present Application for Patent claims priority to U.S. Provisional Application No. 61/345,013, entitled, "DAI DESIGNS FOR FDD CARRIER AGGREGATION," filed May 14, 2010, and assigned to the assignee hereof and hereby expressly incorporated by reference herein.

TECHNICAL FIELD

Certain aspects of the present disclosure generally relate to wireless communications and, more particularly, to monitoring and acknowledging downlink transmissions in multi-carrier systems.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point. In an FDD system, uplink and downlink transmissions take place at the same time on different carrier frequencies.

SUMMARY

Certain aspects of the present disclosure provide a method for wireless communications. The method generally includes generating a downlink assignment index (DAI) indicating a number of assigned downlink transmissions for a user equipment (UE) configured to communicate using multiple component carriers and transmitting a physical downlink control channel (PDCCH) containing the DAI to the user equipment (UE) in a frequency division duplexing (FDD) subframe in which uplink and downlink transmissions may take place at the same time on different carrier frequencies.

Certain aspects of the present disclosure provide a method for wireless communications. The method generally includes receiving, from an eNodeB, a physical downlink control channel (PDCCH) in a frequency division duplexing (FDD) subframe in which uplink and downlink transmissions may take place at the same time on different carrier frequencies and determining, based on a downlink assignment index (DAI) included in the PDCCH, a number of assigned downlink transmissions from the eNodeB.

Certain aspects of the present disclosure provide an apparatus for wireless communications. The apparatus generally includes means for generating a downlink assignment index (DAI) indicating a number of assigned downlink transmissions for a user equipment (UE) configured to communicate using multiple component carriers and means for transmitting a physical downlink control channel (PDCCH) containing the DAI to the user equipment (UE) in a frequency division duplexing (FDD) subframe in which uplink and downlink transmissions may take place at the same time on different carrier frequencies.

Certain aspects of the present disclosure provide an apparatus for wireless communications. The apparatus generally includes means for receiving, from an eNodeB, a physical downlink control channel (PDCCH) in a frequency division duplexing (FDD) subframe in which uplink and downlink transmissions may take place at the same time on different carrier frequencies and means for determining, based on a downlink assignment index (DAI) included in the PDCCH, a number of assigned downlink transmissions from the eNodeB.

Certain aspects of the present disclosure provide an apparatus for wireless communications. The apparatus generally includes at least one processor configured to generate a downlink assignment index (DAI) indicating a number of assigned downlink transmissions for a user equipment (UE) configured to communicate using multiple component carriers and transmit a physical downlink control channel (PDCCH) containing the DAI to the user equipment (UE) in a frequency division duplexing (FDD) subframe in which uplink and downlink transmissions may take place at the same time on different carrier frequencies; and a memory coupled with the at least one processor.

Certain aspects of the present disclosure provide an apparatus for wireless communications. The apparatus generally includes at least one processor configured to receive, from an eNodeB, a physical downlink control channel (PDCCH) in a frequency division duplexing (FDD) subframe in which uplink and downlink transmissions may take place at the same time on different carrier frequencies and determine, based on a downlink assignment index (DAI) included in the PDCCH, a number of assigned downlink transmissions from the eNodeB; and a memory coupled with the at least one processor.

Certain aspects of the present disclosure provide a computer program product comprising instructions for wireless communications stored thereon. The instructions executable by one or more processors for generating a downlink assignment index (DAI) indicating a number of assigned downlink transmissions for a user equipment (UE) configured to communicate using multiple component carriers and transmitting a physical downlink control channel (PDCCH) containing the DAI to the user equipment (UE) in a frequency division duplexing (FDD) subframe in which uplink and downlink transmissions may take place at the same time on different carrier frequencies.

Certain aspects of the present disclosure provide a computer program product comprising instructions for wireless communications stored thereon. The instructions executable by one or more processors for receiving, from an eNodeB, a physical downlink control channel (PDCCH) in a frequency division duplexing (FDD) subframe in which uplink and downlink transmissions may take place at the same time on different carrier frequencies and determining, based on a downlink assignment index (DAI) included in the PDCCH, a number of assigned downlink transmissions from the eNodeB.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 10-13 illustrate example mappings of downlink assignment index (DAI) bits to combinations of downlink grants and accumulated index values, in accordance with certain aspects of the present disclosure.

DETAILED DESCRIPTION

Figure 1:
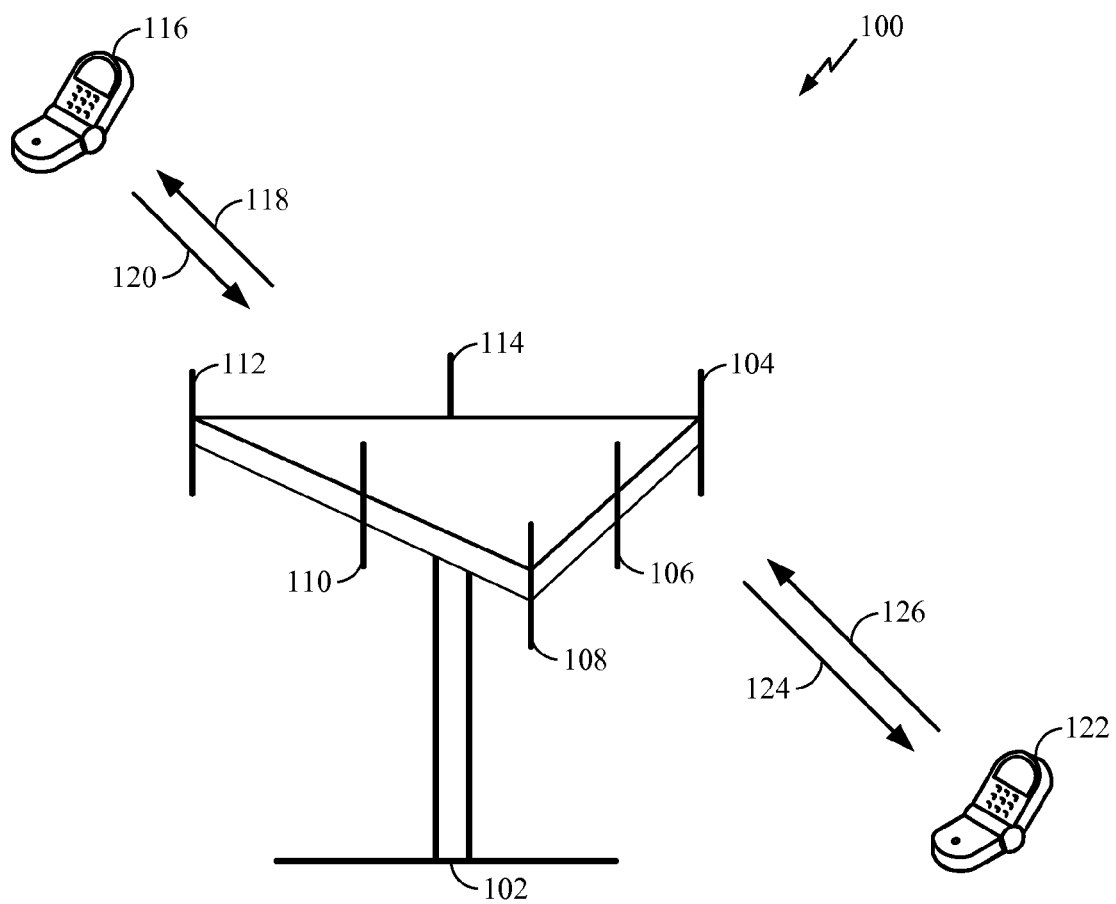
FIG. 1 illustrates an example multiple access wireless communication system in accordance with certain aspects of the present disclosure.

Certain aspects of the present disclosure provide techniques that may be utilized to help limit the amount of processing a user equipment (UE) does to detect and obtain downlink control information. According to certain aspects, a preconfiguration indicating which, of a plurality of component carriers, are used to transmit downlink control channel information (DCI) to at least one user equipment (UE) in predetermined subframes may be shared between a eNodeB and the UE. DCI is a message carried by a PDCCH. It includes control information such as resource assignments for a UE or a group of UEs. The control information sent on each PDCCH may convey one or more downlink grants, one or more uplink grants, power control information, and/or other information. A downlink grant may carry control information for data transmission on the downlink. An uplink grant may carry control information for data transmission on the uplink. A grant may be sent to a specific UE or a group of UEs. A grant may also be referred to as an assignment. A UE may be configured to listen to one or more instances of the PDCCH. The UE may rely on this configuration to limit the number of search spaces it monitors for blind decoding of messages (e.g., physical downlink control channel-PDCCH messages) carrying DCI.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
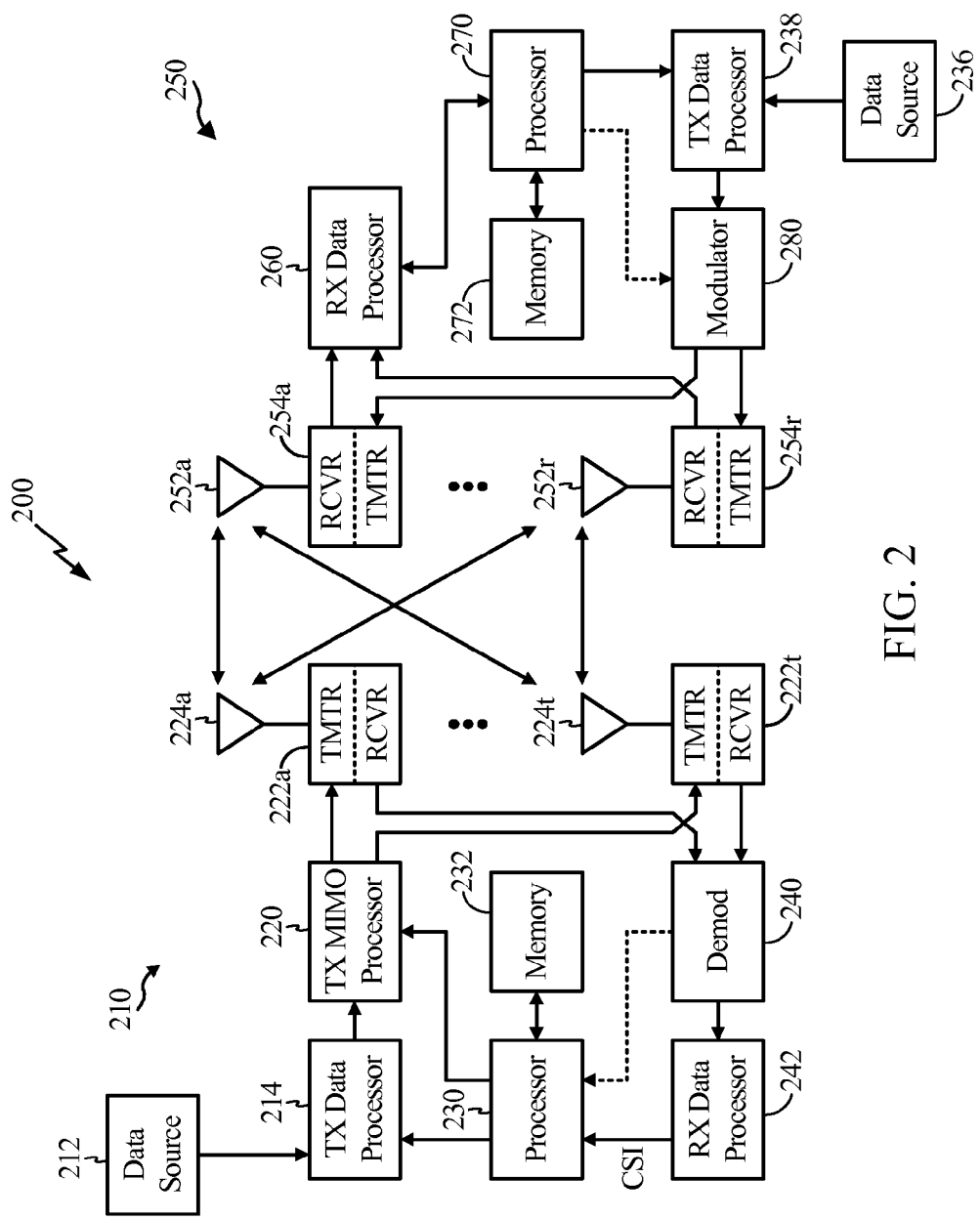
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions stored in memory 232 and performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion using instructions stored in memory 272. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 3:
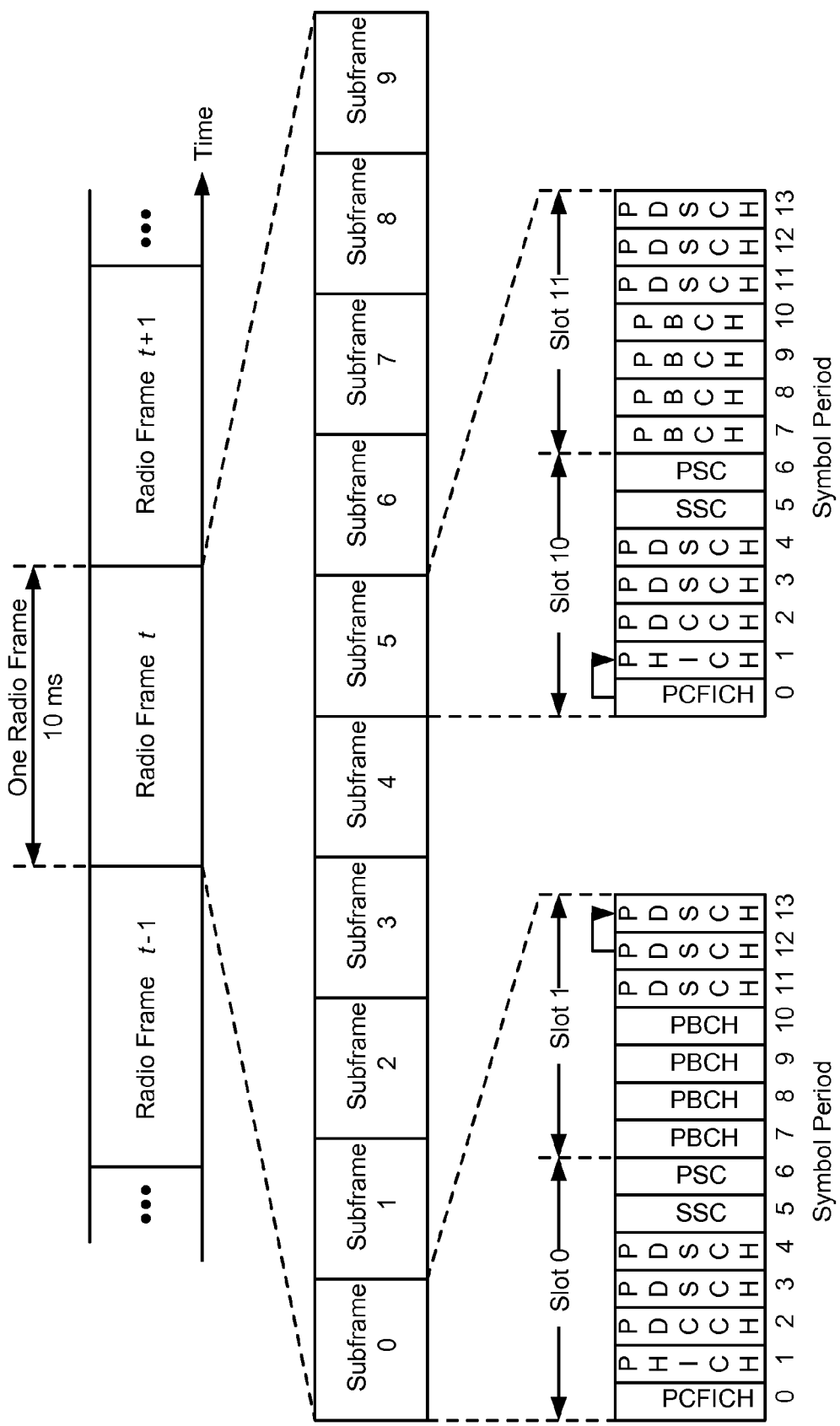
FIG. 3 is a block diagram conceptually illustrating an example of a down link frame structure in a telecommunications system.

FIG. 3 shows an example down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNodeB may send a Physical HARQ Indicator Channel (PHICH) and a Physical Downlink Control Channel (PDCCH) in the first M symbol periods of each subframe (M=3 in FIG. 3). The PHICH may carry information to support hybrid automatic retransmission (HARQ). The PDCCH may carry information on uplink and downlink resource allocation for UEs and power control information for uplink channels. Although not shown in the first symbol period in FIG. 3, it is understood that the PDCCH and PHICH are also included in the first symbol period. Similarly, the PHICH and PDCCH are also both in the second and third symbol periods, although not shown that way in FIG. 3. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Carrier Aggregation

LTE-Advanced UEs use spectrum up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
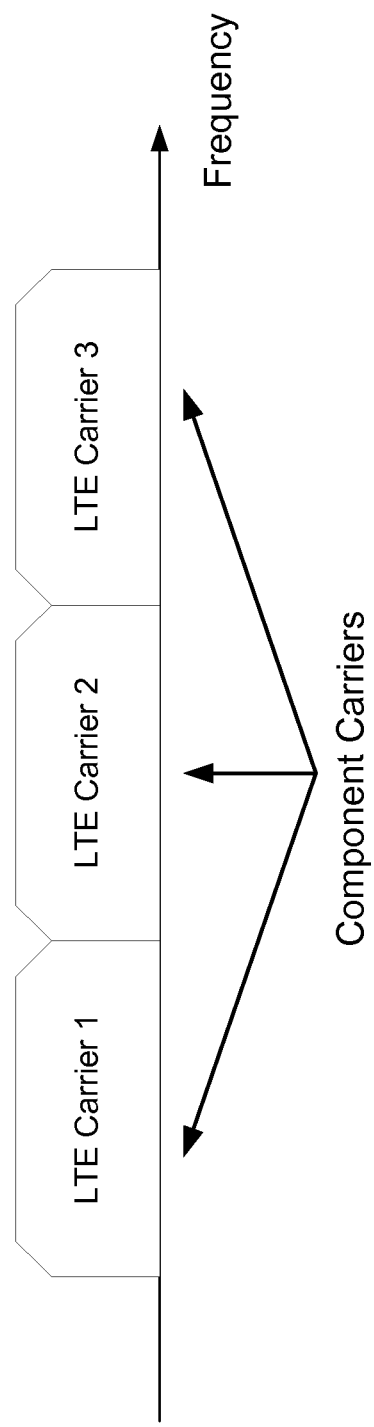
FIG. 4A discloses a continuous carrier aggregation type.
Figure 4B:
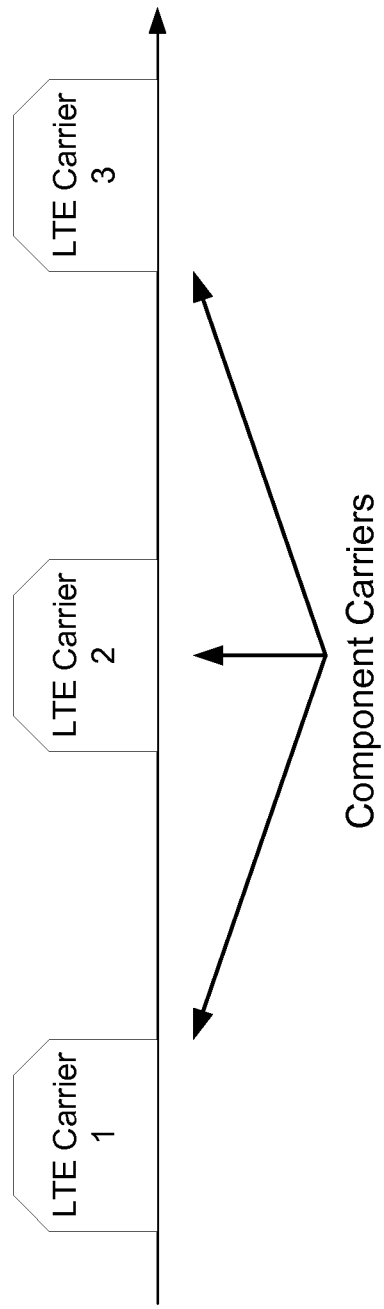
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
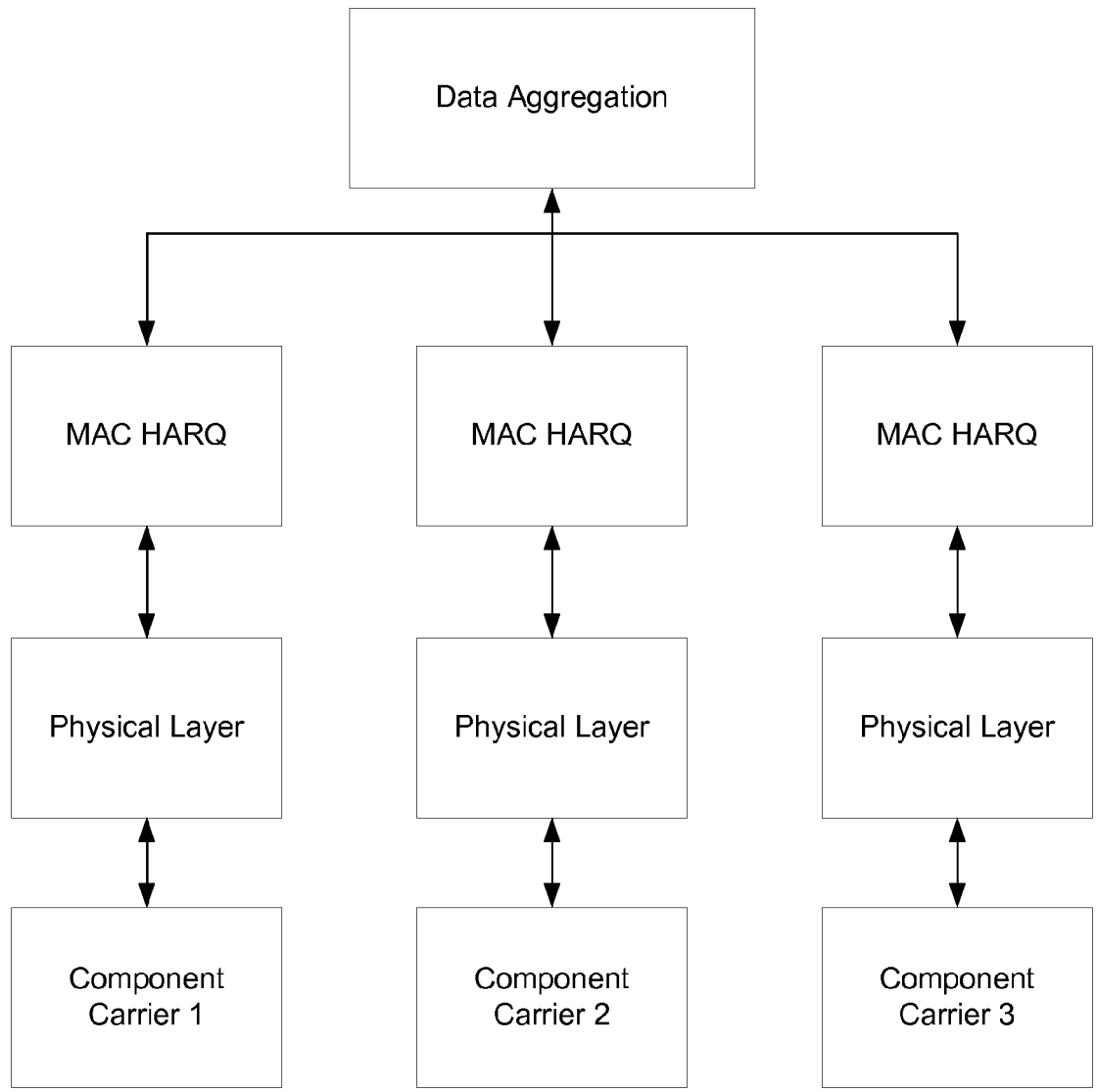
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE RRC protocol.

Figure 6:
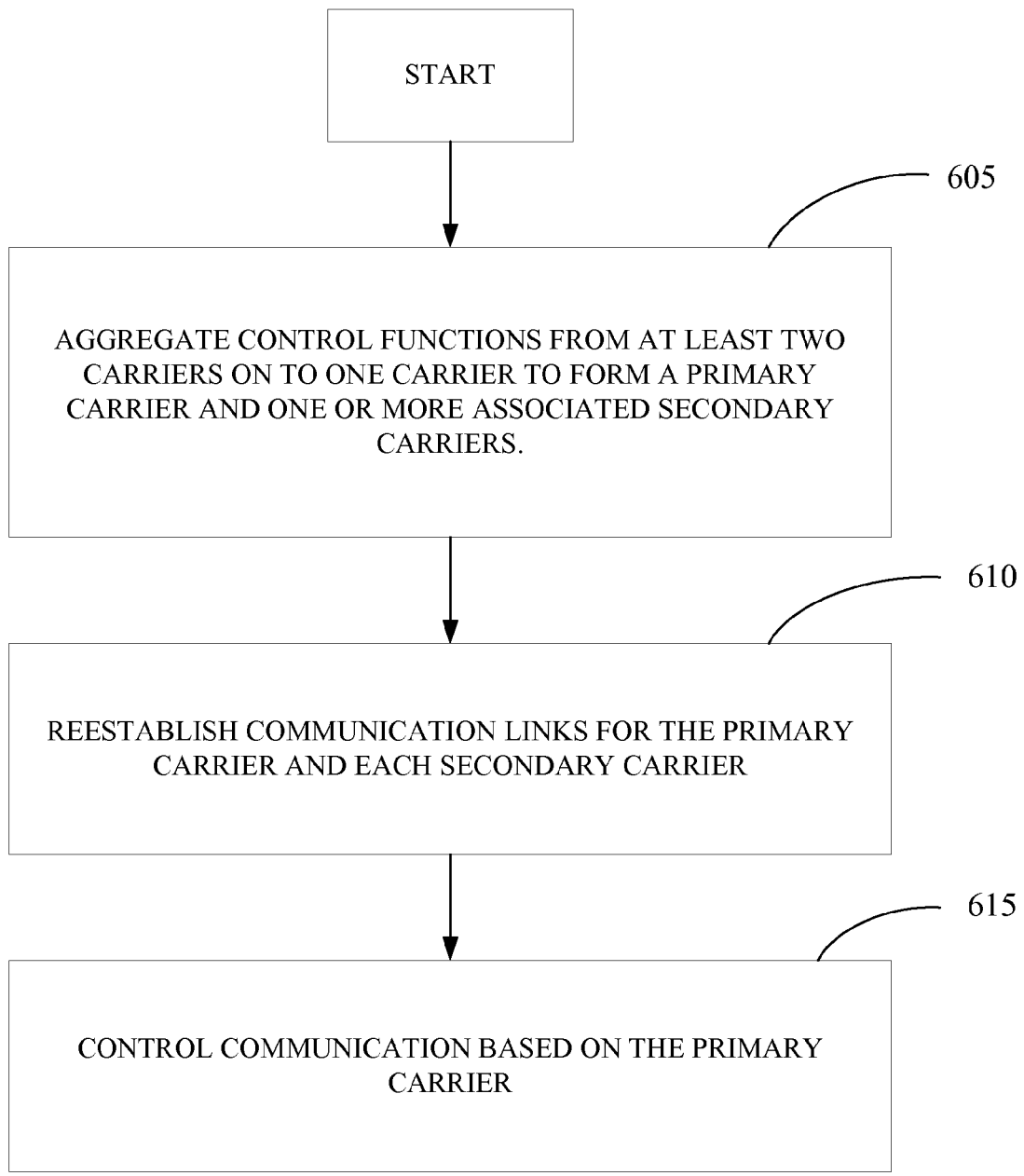
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

DAI Designs for FDD Carrier Aggregation

As defined in Section 7.3 of 3GPP TS36.213, a downlink assignment index (DAI) generally refers to a field in a downlink resource grant (PDCCH) signaled to a user equipment (UE), that indicates how many subframes in a previous time window have contained transmissions to that UE. By providing an indication of the number of assigned downlink transmissions, the DAI enables the UE to determine whether it has received all the downlink transport blocks for which it transmits a combined acknowledgement/negative acknowledgement (ACK/NACK).

In long term evolution release 8 (LTE Rel-8), for TDD uplink and downlink (UL/DL) configurations 1-6, a two-bit downlink assignment index (DAI) is present in downlink control information (DCI) formats 1/1A/1B/1D/2/2A/2B. The two-bit downlink assignment index denotes the accumulative number of physical downlink control channels (PDCCHs) with assigned physical downlink shared channel (PDSCH) transmissions and a PDCCH indicating DL semi-persistent scheduling (SPS) release up to the present subframe within subframes n-k, where k belongs to K and K denotes the set of DL subframes mapped onto the corresponding UL subframe: n. With SPS, a set of resources and transport formats are pre-allocated and are persistently maintained during a specific time interval. As a result, SPS parameters (e.g., periodicity) are configured semi-statically through RRC signaling (i.e., the RRC layer in L3). For example, when a predetermined amount of data is transmitted during a specific time interval in the same way, control information need not be transmitted each data transmission interval for resource allocation. Thus, the amount of control information that is transmitted may be reduced when using SPS.

In DCI format 0, a 2-bit DAI may be used. A DAI detected by the UE in subframe n-k' represents the total number of subframes with PDSCH transmissions and with PDCCH indicating downlink SPS release within subframes n-k', where k' belongs to K, where k', K are defined in 3GPP TS 36.213, "E-UTRA: Physical Layer Procedures."

Conventionally, a DAI is utilized only when operating in time domain duplex (TDD) mode. In single component carrier systems operating in an FDD mode, a DAI may not be needed, as the FDD mode generally provides an uplink subframe corresponding to each downlink subframe.

However, as noted above, in advanced systems such as those contemplated in long term evolution release 10 (LTE Rel-10), multiple component carriers (CCs) are to be supported for uplink and downlink transmissions. As noted above, there may not be a one-to-one correspondence between CCs used for uplink and downlink transmissions. As there may be fewer CCs used for uplink transmissions, it may be beneficial to allow for bundling ACK/NACK feedback of downlink transmissions received across multiple component carriers.

In order to facilitate the ACK/NACK feedback in the UL, certain aspects of the present disclosure, provide for the transmission of a multi-bit DAI in corresponding DCI formats for FDD systems. This may help a UE detect missing downlink assignments and also to determine the accurate ACK/NACK feedback payload and thus be able to determine appropriate format of feedback, including coding, PUCCH format selection, PUCCH power control, and computing the number of resource elements for ACK/NACK to occupy, while being multiplexed together with PUSCH.

According to certain aspects, FDD DAI may comprise a multi-bit (e.g., x-bit) field provided in one or more DCI formats for DL (and possibly UL) scheduling for FDD systems. As noted above, the DAI may be used for indicating a total number of PDCCHs with assigned PDSCH transmissions and PDCCH indicating downlink SPS release. According to certain aspects, the DAI may also indicate the accumulative index of PDCCHs with assigned PDSCH transmissions and a PDCCH indicating DL SPS release. A UE may use this index to determine where a missing downlink transmission is in a sequence of scheduled transmissions.

Figure 7:
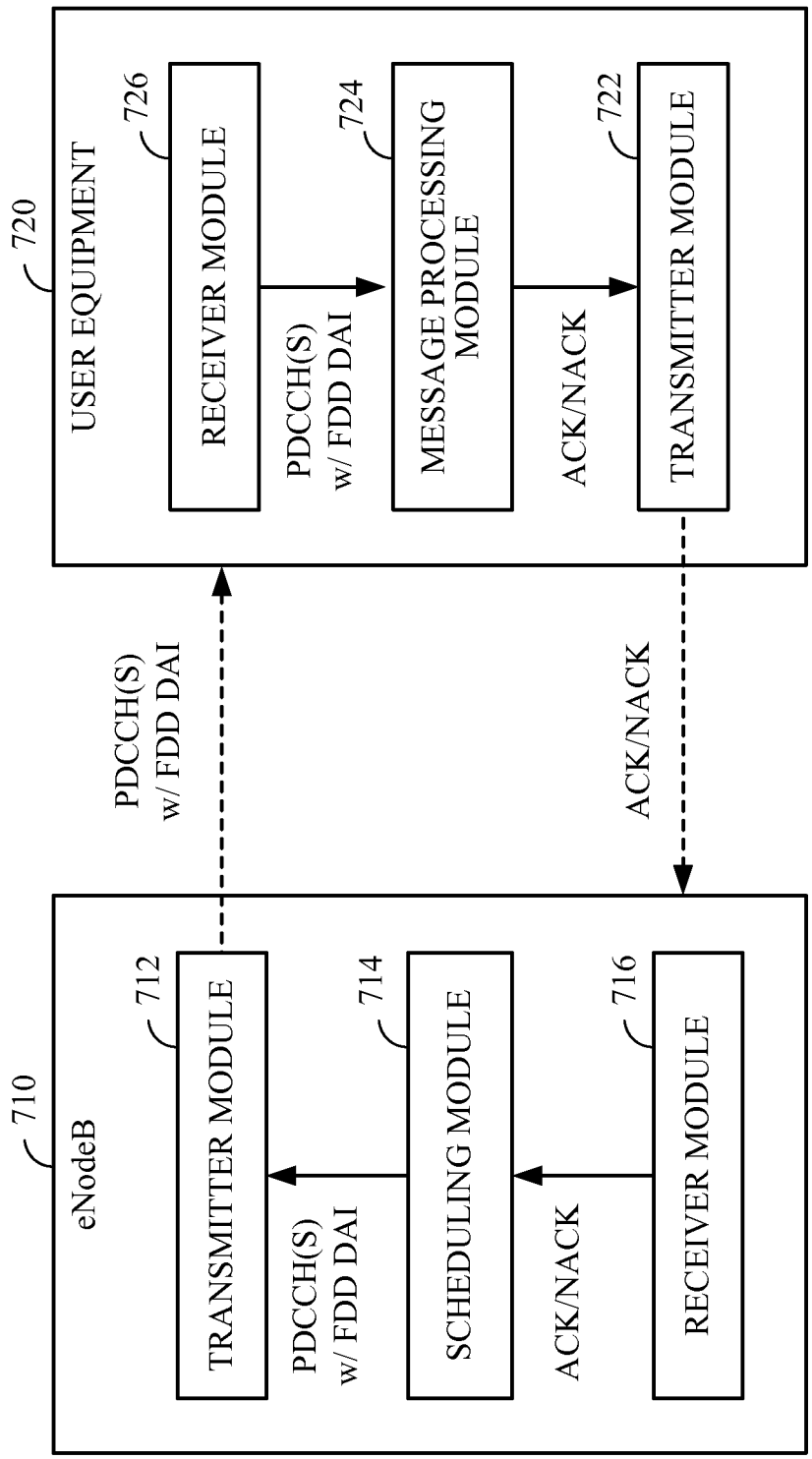
FIG. 7 illustrates a block diagram conceptually illustrating an operation of an eNodeB with a user equipment, in accordance with certain aspects of the present disclosure.

FIG. 7 illustrates an example wireless system 700 with an eNodeB 710 and UE 720 capable for performing operations described herein.

According to certain aspects, the eNodeB 710 may include a scheduling module 714. The scheduling module 714 may be generally configured to determine downlink assignments for an FDD subframe. The scheduling module may also be configured to generate a DAI indicating a number of downlink assignments in the FDD subframe and provide the DAI as downlink control information (DCI) transmitted with the physical downlink control channel (PDCCH) transmissions for downlink and/or uplink grants.

The DAI may indicate a number of downlink transmissions sent using a plurality of component carriers. As will be described below with reference to FIGS. 10-13, the exact format of the DAI may depend on the number of component carriers for which the UE is configured.

As illustrated, the eNodeB 710 may transmit the DAI to the UE 720, via a transmitter module 712, in a PDCCH transmission. The UE 720 may receive the PDCCH, via a receiver module 726, extract the DAI and provide the DAI to a message processing module 724. The message processing module 724 may utilize the DAI, for example, to detect missing downlink transmissions assigned to the UE 720, determine a payload size and format of corresponding feedback.

The feedback may comprise bundled ACK/NACK transmissions, sent via a transmitter module 722, acknowledging (or negatively acknowledging) receipt of downlink transmissions transmitted via multiple component carriers. According to certain aspects, one or more bits may be sent with the PDCCH for a downlink grant indicating resources (e.g., orthogonal resources) to use for the feedback. The eNodeB 710 may receive the feedback, via a receiver module 716. The feedback may be provided to the scheduler module 714, for example, for use in determining whether or not to re-transmit a downlink transmission that was not successfully received.

Figure 8:
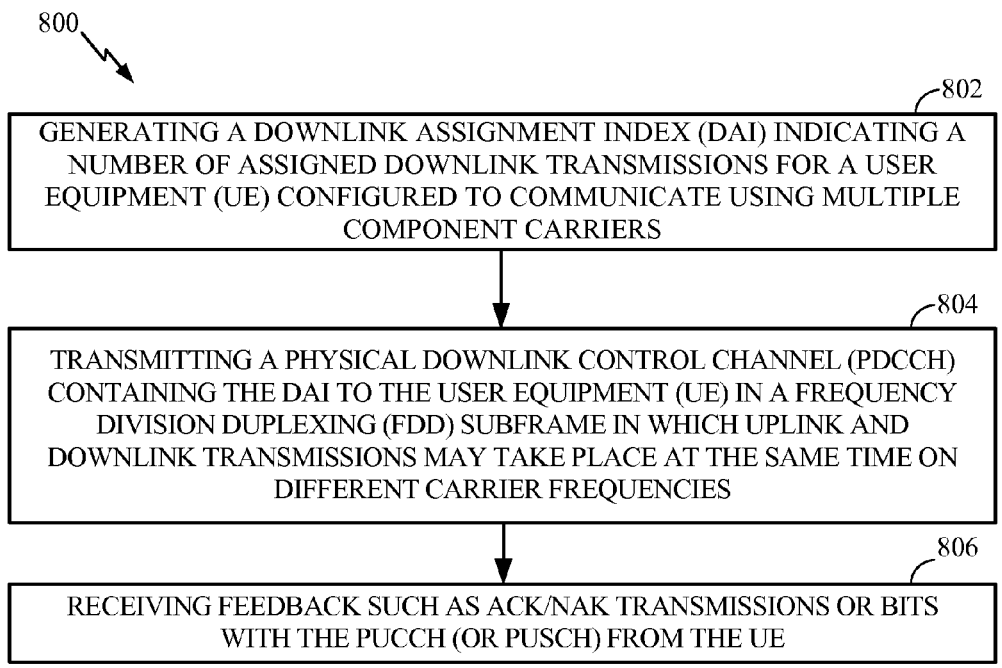
FIG. 8 illustrates an example operation that may be performed by an eNodeB in accordance with certain aspects of the present disclosure.

FIG. 8 illustrates example operations 800 that may be performed, for example, by a base station, such as eNodeB 710 of FIG. 7.

The operations 800 begin, at 802, by generating a downlink assignment index (DAI) indicating a number of assigned downlink transmissions for a user equipment (UE) 720 configured to communicate using multiple component carriers. At 804, the eNodeB 710 transmits a physical downlink control channel (PDCCH) containing the DAI to the user equipment (UE) 720 in a frequency division duplexing (FDD) subframe in which uplink and downlink transmissions may take place at the same time on different carrier frequencies. At 806, the eNodeB 710 receives feedback such as ACK/NACK transmissions or bits with the PUCCH (or PUSCH) from the UE.

Figure 9:
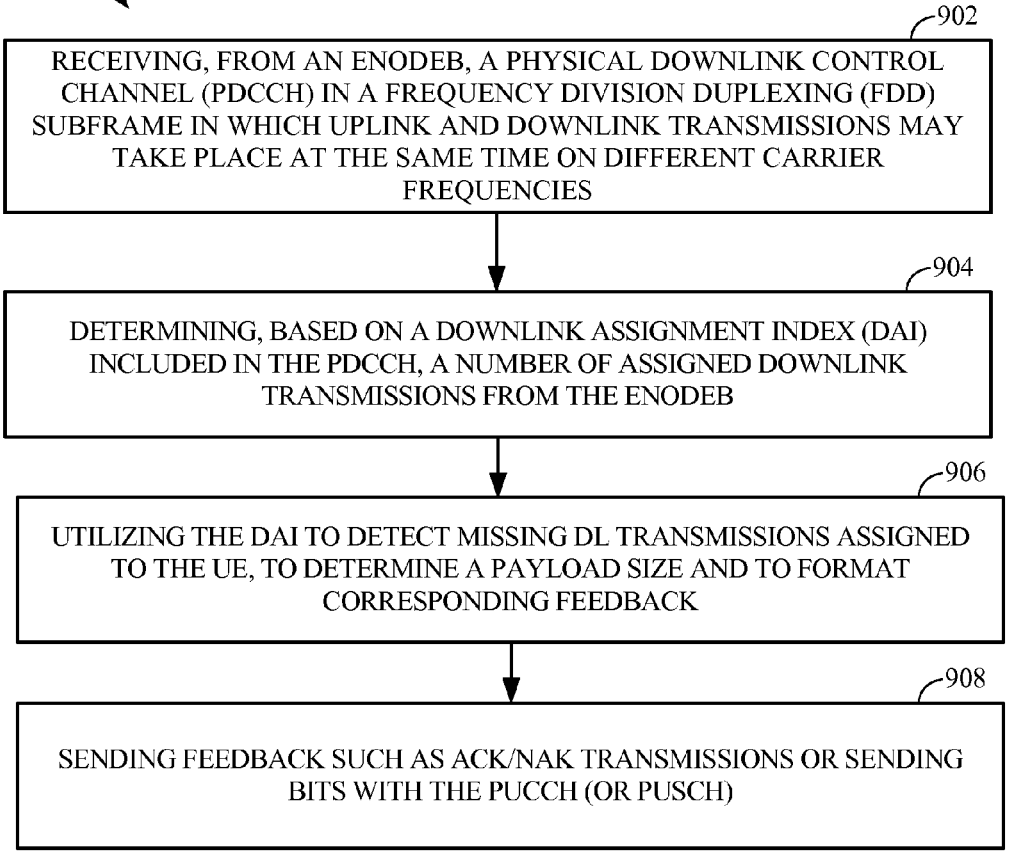
FIG. 9 illustrates an example operation that may be performed by a user equipment in accordance with certain aspects of the present disclosure.

FIG. 9 illustrates example operations 900 that may be performed, for example, by a UE, such as UE 720 of FIG. 7.

The operations 900 begin, at 902, by receiving, from an eNodeB 710, a physical downlink control channel (PDCCH) in a frequency division duplexing (FDD) subframe in which uplink and downlink transmissions may take place at the same time on different carrier frequencies. At 904, the UE 720 determines, based on a downlink assignment index (DAI) included in the PDCCH, a number of assigned downlink transmissions from the eNodeB. At 906, the UE 720 utilizes the DAI to detect missing DL transmission assigned to the UE, to determine a payload size and to format corresponding feedback. At 908, the UE 720 sends feedback such as ACK/NACK transmissions or sending bits with the PUCCH (or PUSCH).

As noted above, by providing an accumulative index indicating where, in a sequence, a downlink transmission is, a UE may be able to provide an indication of which assigned downlink transmission is missed (e.g., by providing a NACK at a bit location for that particular transmission in a bundled ACK transmission). According to certain aspects, different mappings may be provided between DAI field values and different combinations of total number of downlink assignments and an accumulative index-allowing a single DAI field to indicate both a total number of DL assignments and a location in a sequence of a particular DL transmission.

Figure 10:

For example, when 2 DL CCs are configured for the UE, the mapping may be as shown in table 1000 of FIG. 10. In the illustrated mapping, a 3-bit DAI value of '000' is mapped to a single DL grant (which would only have a single accumulated index value). A DAI value of '001' is mapped to two total DL grants. Without using an additional bit, the DAI value may not be able to distinguish between the sequence of two downlink transmissions and, thus, the DAI value of '001' may be mapped to a range (0-1) of possible index values.

Figure 11:

When 3 DL CCs are configured for the UE, the mapping may be as shown in table 1100 of FIG. 11. In this example, two values '001' and '010' are provided for the case of two DL grants, thus allowing a UE to distinguish between the two. However, a DAI value of '011' may again be mapped to a total of three DL grants and a range of accumulated index values (e.g., 0-2).

The use of accumulated index values may be illustrated as follows, with reference to the mapping values shown in FIG. 11. Assuming a scheme with two actual DL grants, then in the 1st grant, the signaled DAI value will be 001 (representing two total DL grants and an accumulated index value of '0' indicating the first in the sequence of two. In the second DL grant, the signaled DAI value will be 010 (again representing two total DL grants, but with an accumulated index value of '1' indicating the second in the sequence of two).

Thus, as long as the UE receives either one of the grants, the DAI value will allow the UE to know that it may expect to receive a total of two grants and, in case the UE misses one grant, the accumulated index value will allow the UE to know which of the two expected DL grants is missing. The UE may, thus, indicate to the eNodeB which DL grant is missing (e.g., by providing a NACK value in a location corresponding to the missing grant in a sequence of ACK/NACK bits).

Now, again referring to the mapping values shown in FIG. 11, assuming a scheme with three actual DL grants, then in all three of the grants, the signaled DAI value will be 011. As long as the UE detects one of the grants, the UE is able to know it may expect 3 DL grants (one each from all the 3 configured CCs). Since a DL grant is expected on each of the configured CCs, the UE can easily tell which grant is missing.

When 4 DL CCs are configured for the UE, the mapping may be as shown in table 1200 of FIG. 12. In this example, three values '011, 100, 101 are provided for the case of three DL grants, thus allowing a UE to distinguish between the three. However, a DAI value of '110' may again be mapped to a total of four DL grants and a range of accumulated index values (e.g., 0-3).

Finally, when 5 DL CCs are configured for the UE, which may be a maximum allowed, the mapping may be as shown in table 1300 of FIG. 13. In this example, various DAI values may be mapped to different combinations of total DL transmissions and index ranges. For example, a value of '100' may be mapped to 3 DL transmissions and a range of index values 1-2, a value of '101' may be mapped to 4 DL transmissions and a range of index values 0-1, while a value of '110' may be mapped to 4 DL transmissions and a range of index values 2-3, and a value of '110' may be mapped to 5 DL transmissions and a range of index values 0-4.

According to certain aspects, in addition to (or as an alternative to) a DAI field provided in a PDCCH for a downlink grant, a DAI field may also be provided in a PDCCH for an uplink grant. The DAI field sent with an uplink grant may have fewer bits than that send with a downlink grant. Further, according to certain aspects a DAI field may be sent with an uplink grant only in certain cases, for example, when there are a certain number of component carriers being used. As an example, no DAI field may be provided in uplink grants if only 2 or 3 CCs are used, while a DAI field may be provided if 4 or more CCs are used. A UE may use such a DAI field as a "virtual cyclic redundancy check (CRC)" for the UL/DL grants, since the number of downlink assignments received should match the value by the DAI.

Possible schemes that may be used to feed back multiple ACK/NACK bits may include PUCCH format 1a, PUCCH format 1b (Spreading Factor=4) with/without channel selection, PUCCH format 1b (Spreading Factor=2) with/without channel selection, PUCCH format 2, DFT-spread-OFDM based scheme, [2] 3GPP TSG RAN1#61, R1-102743, "Link Comparison of Multi-UL-ACK Transmission Schemes in Support of CA."

Depending on the signaled DAI in the DL grant, a UE may choose the appropriate feedback scheme with determined ACK/NACK payload size.

The ACK/NACK feedback payload size and the corresponding power control of PUCCH (when ACK/NACK is fed back with PUCCH) or the computation of resource elements in PUSCH (when ACK/NACK is multiplexed with PUSCH) can be determined according to various options. For example, according to a first option, the feedback payload size and the following PUCCH power control or resource computation when multiplexing onto PUSCH is determined according to the number of DL CCs configured by radio resource control (RRC). According to a second option, the feedback payload size and the following PUCCH power control or resource computation when multiplexing onto PUSCH is determined according to the number of active DL CCs. According to a third option, the feedback payload size is determined according to the information signaled in DL scheduling grants. A variation is to detect the information at the UE side, which may not be aligned with the eNB information. Preferably, the information at both sides is aligned. According to a fourth option, the feedback payload and the following PUCCH power control or resource computation when multiplexing onto PUSCH size may be determined according to a combination of above options.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various operations of methods described above may be performed by any suitable means capable of performing the corresponding functions. The means may include various hardware and/or software component(s) and/or module(s), including, but not limited to a circuit, an application specific integrated circuit (ASIC), or processor. The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary embodiments, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
    generating a downlink assignment index (DAI) indicating a number of assigned downlink transmissions on a plurality of component carriers for a user equipment (UE) configured to communicate using multiple component carriers; and
    transmitting a physical downlink control channel (PDCCH) containing the DAI to the user equipment (UE) in a frequency division duplexing (FDD) subframe in which uplink and downlink transmissions may take place at the same time on different carrier frequencies.

2. The method of claim 1, wherein the DAI comprises a multi-bit field indicating a total number of downlink transmissions assigned in the FDD subframe.

3. The method of claim 2, wherein the multi-bit field also indicates an accumulative index distinguishing a downlink transmission within the assigned downlink transmissions.

4. The method of claim 2, wherein the multi-bit field also indicates a range of accumulative indices distinguishing downlink transmissions within the assigned downlink transmissions.

5. The method of claim 1, wherein the PDCCH comprises a downlink grant corresponding to one of the assigned downlink transmissions.

6. The method of claim 1, further comprising:
    generating a second downlink assignment index (DAI); and
    transmitting a PDCCH with an uplink grant containing the second DAI.

7. The method of claim 6, wherein a DAI sent with a PDCCH containing a downlink grant has a greater number of bits than a DAI sent with a PDCCH containing an uplink grant.

8. The method of claim 1, wherein the PDCCH further comprises one or more bits indicating resources to be used by the UE in transmitting feedback regarding the downlink transmissions.

9. A method for wireless communications by a user equipment (UE) configured to communicate using multiple component carriers, comprising:
    receiving, from an eNodeB, a physical downlink control channel (PDCCH) in a frequency division duplexing (FDD) subframe in which uplink and downlink transmissions may take place at the same time on different carrier frequencies; and
    determining, based on a downlink assignment index (DAI) included in the PDCCH, a number of assigned downlink transmissions on a plurality of the component carriers from the eNodeB.

10. The method of claim 9, further comprising determining, based on the DAI, whether a downlink assignment was missed.

11. The method of claim 9, wherein the DAI comprises a multi-bit field indicating a total number of downlink transmissions assigned in the FDD subframe.

12. The method of claim 11, wherein the multi-bit field also indicates an accumulative index distinguishing a downlink transmission within the assigned downlink transmissions.

13. The method of claim 11, wherein the multi-bit field also indicates a range of accumulative indices distinguishing downlink transmissions within the assigned downlink transmissions.

14. The method of claim 9, further comprising performing power control for an physical uplink control channel (PUCCH) based on at least one of the DAI or a number of detected PDSCH transmissions.

15. The method of claim 9, wherein the PDCCH comprises a downlink grant corresponding to one of the assigned downlink transmissions.

16. The method of claim 9, wherein the DAI comprises at least three bits.

17. The method of claim 9, wherein the PDCCH comprises an uplink grant.

18. The method of claim 17, wherein a DAI contained in a PDCCH with a downlink grant has a greater number of bits than a DAI contained in a PDCCH with an uplink grant.

19. The method of claim 17, further comprising computing a number of resource elements occupied by ACK/NACKs multiplexed with a physical uplink shared channel (PUSCH) based on at least one of DAIs in both downlink and uplink grants or a total number of configured downlink component carriers.

20. The method of claim 9, further comprising determining, based on one or more bits in the PDCCH, resources to be used in transmitting feedback regarding the downlink transmissions.

21. An apparatus for wireless communications, comprising:
    means for generating a downlink assignment index (DAI) indicating a number of assigned downlink transmissions on a plurality of component carriers for a user equipment (UE) configured to communicate using multiple component carriers; and
    means for transmitting a physical downlink control channel (PDCCH) containing the DAI to the user equipment (UE) in a frequency division duplexing (FDD) subframe in which uplink and downlink transmissions may take place at the same time on different carrier frequencies.

22. The apparatus of claim 21, wherein the DAI comprises a multi-bit field indicating a total number of downlink transmissions assigned in the FDD subframe.

23. The apparatus of claim 22, wherein the multi-bit field also indicates an accumulative index distinguishing a downlink transmission within the assigned downlink transmissions.

24. The apparatus of claim 22, wherein the multi-bit field also indicates a range of accumulative indices distinguishing downlink transmissions within the assigned downlink transmissions.

25. The apparatus of claim 21, wherein the PDCCH comprises a downlink grant corresponding to one of the assigned downlink transmissions.

26. The apparatus of claim 21, further comprising:
means for generating a second downlink assignment index (DAI); and
means for transmitting a PDCCH with an uplink grant containing the second DAI.

27. The apparatus of claim 26, wherein a DAI sent with a PDCCH containing a downlink grant has a greater number of bits than a DAI sent with a PDCCH containing an uplink grant.

28. The apparatus of claim 21, wherein the PDCCH further comprises one or more bits indicating resources to be used by the UE in transmitting feedback regarding the downlink transmissions.

29. An apparatus for wireless communications, comprising:
means for receiving, from an eNodeB, a physical downlink control channel (PDCCH) in a frequency division duplexing (FDD) subframe in which uplink and downlink transmissions may take place at the same time on different carrier frequencies; and
means for determining, based on a downlink assignment index (DAI) included in the PDCCH, a number of assigned downlink transmissions on a plurality of component carriers from the eNodeB.

30. The apparatus of claim 29, further comprising means for determining, based on the DAI, whether a downlink assignment was missed.

31. The apparatus of claim 29, wherein the DAI comprises a multi-bit field indicating a total number of downlink transmissions assigned in the FDD subframe.

32. The apparatus of claim 31, wherein the multi-bit field also indicates an accumulative index distinguishing a downlink transmission within the assigned downlink transmissions.

33. The apparatus of claim 31, wherein the multi-bit field also indicates a range of accumulative indices distinguishing downlink transmissions within the assigned downlink transmissions.

34. The apparatus of claim 29, further comprising means for performing power control for an physical uplink control channel (PUCCH) based on at least one of the DAI or a number of detected PDSCH transmissions.

35. The apparatus of claim 29, wherein the PDCCH comprises a downlink grant corresponding to one of the assigned downlink transmissions.

36. The apparatus of claim 29, wherein the DAI comprises at least three bits.

37. The apparatus of claim 29, wherein the PDCCH comprises an uplink grant.

38. The apparatus of claim 37, wherein a DAI contained in a PDCCH with a downlink grant has a greater number of bits than a DAI contained in a PDCCH with an uplink grant.

39. The apparatus of claim 37, further comprising means for computing a number of resource elements occupied by ACK/NACKs multiplexed with a physical uplink shared channel (PUSCH) based on at least one of DAIs in both downlink and uplink grants or a total number of configured downlink component carriers.

40. The apparatus of claim 29, further comprising means for determining, based on one or more bits in the PDCCH, resources to be used in transmitting feedback regarding the downlink transmissions.

41. An apparatus for wireless communications, comprising:
at least one processor configured to generate a downlink assignment index (DAI) indicating a number of assigned downlink transmissions on a plurality of component carriers for a user equipment (UE) configured to communicate using multiple component carriers and transmit a physical downlink control channel (PDCCH) containing the DAI to the user equipment (UE) in a frequency division duplexing (FDD) subframe in which uplink and downlink transmissions may take place at the same time on different carrier frequencies; and
a memory coupled with the at least one processor.

42. The apparatus of claim 41, wherein the DAI comprises a multi-bit field indicating a total number of downlink transmissions assigned in the FDD subframe.

43. The apparatus of claim 42, wherein the multi-bit field also indicates an accumulative index distinguishing a downlink transmission within the assigned downlink transmissions.

44. The apparatus of claim 42, wherein the multi-bit field also indicates a range of accumulative indices distinguishing downlink transmissions within the assigned downlink transmissions.

45. The apparatus of claim 41, wherein the PDCCH comprises a downlink grant corresponding to one of the assigned downlink transmissions.

46. The apparatus of claim 41, wherein the at least one processor is further configured to:
generate a second downlink assignment index (DAI); and
transmit a PDCCH with an uplink grant containing the second DAI.

47. The apparatus of claim 46, wherein a DAI sent with a PDCCH containing a downlink grant has a greater number of bits than a DAI sent with a PDCCH containing an uplink grant.

48. The apparatus of claim 41, wherein the PDCCH further comprises one or more bits indicating resources to be used by the UE in transmitting feedback regarding the downlink transmissions.

49. An apparatus for wireless communications, comprising:
at least one processor configured to receive, from an eNodeB, a physical downlink control channel (PDCCH) in a frequency division duplexing (FDD) subframe in which uplink and downlink transmissions may take place at the same time on different carrier frequencies and determine, based on a downlink assignment index (DAI) included in the PDCCH, a number of assigned downlink transmissions on a plurality of component carriers from the eNodeB; and
a memory coupled with the at least one processor.

50. The apparatus of claim 49, wherein the at least one processor is further configured to determine, based on the DAI, whether a downlink assignment was missed.

51. The apparatus of claim 49, wherein the DAI comprises a multi-bit field indicating a total number of downlink transmissions assigned in the FDD subframe.

52. The apparatus of claim 51, wherein the multi-bit field also indicates an accumulative index distinguishing a downlink transmission within the assigned downlink transmissions.

53. The apparatus of claim 51, wherein the multi-bit field also indicates a range of accumulative indices distinguishing downlink transmissions within the assigned downlink transmissions.

54. The apparatus of claim 49, wherein the at least one processor is further configured to perform power control for an physical uplink control channel (PUCCH) based on at least one of the DAI or a number of detected PDSCH transmissions.

55. The apparatus of claim 49, wherein the PDCCH comprises a downlink grant corresponding to one of the assigned downlink transmissions.

56. The apparatus of claim 49, wherein the DAI comprises at least three bits.

57. The apparatus of claim 49, wherein the PDCCH comprises an uplink grant.

58. The apparatus of claim 57, wherein a DAI contained in a PDCCH with a downlink grant has a greater number of bits than a DAI contained in a PDCCH with an uplink grant.

59. The apparatus of claim 57, wherein the at least one processor is further configured to compute a number of resource elements occupied by ACK/NACKs multiplexed with a physical uplink shared channel (PUSCH) based on at least one of DAIs in both downlink and uplink grants or a total number of configured downlink component carriers.

60. The apparatus of claim 49, wherein the at least one processor is further configured to determine, based on one or more bits in the PDCCH, resources to be used in transmitting feedback regarding the downlink transmissions.

61. A computer program product comprising a non-transitory computer readable medium having instructions for wireless communications stored thereon, the instructions executable by one or more processors for:
generating a downlink assignment index (DAI) indicating a number of assigned downlink transmissions on a plurality of component carriers for a user equipment (UE) configured to communicate using multiple component carriers; and
transmitting a physical downlink control channel (PDCCH) containing the DAI to the user equipment (UE) in a frequency division duplexing (FDD) subframe in which uplink and downlink transmissions may take place at the same time on different carrier frequencies.

62. A computer program product comprising a non-transitory computer readable medium having instructions for wireless communications stored thereon, the instructions executable by one or more processors for:
receiving, from an eNodeB, a physical downlink control channel (PDCCH) in a frequency division duplexing (FDD) subframe in which uplink and downlink transmissions may take place at the same time on different carrier frequencies; and
determining, based on a downlink assignment index (DAI) included in the PDCCH, a number of assigned downlink transmissions on a plurality of component carriers from the eNodeB.

* * * * *